United States Patent
Pavkov et al.

(10) Patent No.: US 6,733,060 B1
(45) Date of Patent: May 11, 2004

(54) CARGO STORAGE DEVICE FOR A VEHICLE

(75) Inventors: Aaron Pavkov, Salina, KS (US);
Charles Amoh, Strongsville, OH (US);
Charlene Chu, Westlake, OH (US);
David Lung, Glastonbury, CT (US);
Jonlin Pei, New Hyde Park, NY (US);
Josh Urso, Arlington, VA (US); Konn Lam, Alhambra, CA (US)

(73) Assignee: Ford Motor Company, Dearborn, MI (US)

( * ) Notice: Subject to any disclaimer, the term of this patent is extended or adjusted under 35 U.S.C. 154(b) by 53 days.

(21) Appl. No.: 10/248,878

(22) Filed: Feb. 26, 2003

(51) Int. Cl.[7] .................................................. B60R 5/04
(52) U.S. Cl. .................... 296/37.16; 296/191; 108/110; 211/187; 224/495; 224/543; 224/564; 248/243
(58) Field of Search ................................ 296/24.1, 26.1, 296/26.11, 26.08, 26.09, 37.1, 37.8, 37.16, 191; 108/110; 211/134, 150, 186, 187; 224/275, 281, 282, 488, 495, 496, 497, 499, 502, 539, 542, 543, 545, 564, 925; 248/235, 240.01, 240.04, 241, 243

(56) References Cited

U.S. PATENT DOCUMENTS

| | | | | |
|---|---|---|---|---|
| 2,767,896 A | * | 10/1956 | Beck | 224/541 |
| 2,848,273 A | * | 8/1958 | Diaz | 296/65.09 |
| 2,889,097 A | * | 6/1959 | Broehl | 224/542 |
| 3,181,911 A | * | 5/1965 | Peras | 296/37.1 |
| 4,944,544 A | * | 7/1990 | Dick | 296/37.1 |
| 5,167,433 A | * | 12/1992 | Ryan | 296/37.1 |
| 5,193,874 A | * | 3/1993 | German et al. | 296/37.1 |
| 5,441,183 A | * | 8/1995 | Frenzel | 224/542 |
| 5,667,115 A | | 9/1997 | Verhaeg | 224/275 |
| 5,669,537 A | * | 9/1997 | Saleem et al. | 224/539 |
| 5,947,358 A | * | 9/1999 | Wieczorek | 224/543 |
| 6,050,202 A | | 4/2000 | Thompson | 108/44 |
| 6,065,794 A | * | 5/2000 | Schlachter | 296/37.6 |
| 6,176,535 B1 | | 1/2001 | Chaloult et al. | 296/37.16 |
| 6,206,260 B1 | | 3/2001 | Covell et al. | 224/539 |
| 6,338,518 B1 | | 1/2002 | D'Annunzio et al. | 296/37.8 |
| 6,375,055 B1 | | 4/2002 | Spykermann et al. | 224/542 |
| 6,386,412 B1 | | 5/2002 | Konechne | 224/543 |
| 2003/0090120 A1 | * | 5/2003 | Barber et al. | 296/37.5 |

FOREIGN PATENT DOCUMENTS

| | | | | |
|---|---|---|---|---|
| JP | 54-157908 A | * | 12/1979 | 296/37.16 |
| JP | 56-057537 A | * | 5/1981 | 296/37.8 |
| JP | 57-138446 A | * | 8/1982 | 296/37.16 |
| JP | 61-075036 A | * | 4/1986 | 296/37.16 |
| JP | 61-122048 A | * | 6/1986 | 296/37.16 |
| JP | 61-249850 A | * | 11/1986 | 296/37.16 |
| JP | 06-191436 A | * | 7/1994 | 296/37.1 |

* cited by examiner

*Primary Examiner*—D. Glenn Dayoan
*Assistant Examiner*—Paul Chenevert
(74) *Attorney, Agent, or Firm*—Gigette M. Bejin

(57) ABSTRACT

The present invention provides a cargo storage device for a vehicle having a passenger space and an end gate including a back end situated adjacent a rearward-most seat, at least one pair of sidewalls extending from the back end and having a plurality of storage units therein, a floor situated between the sidewalls and reconfigurable between a lowered position and a raised position, a door situated in the floor and pivotally operable between a closed position and an opened position, an organizational bin situated beneath the floor and having a plurality of dividers therein, and wherein at least two opposing storage units have identical tracks thereon.

20 Claims, 4 Drawing Sheets

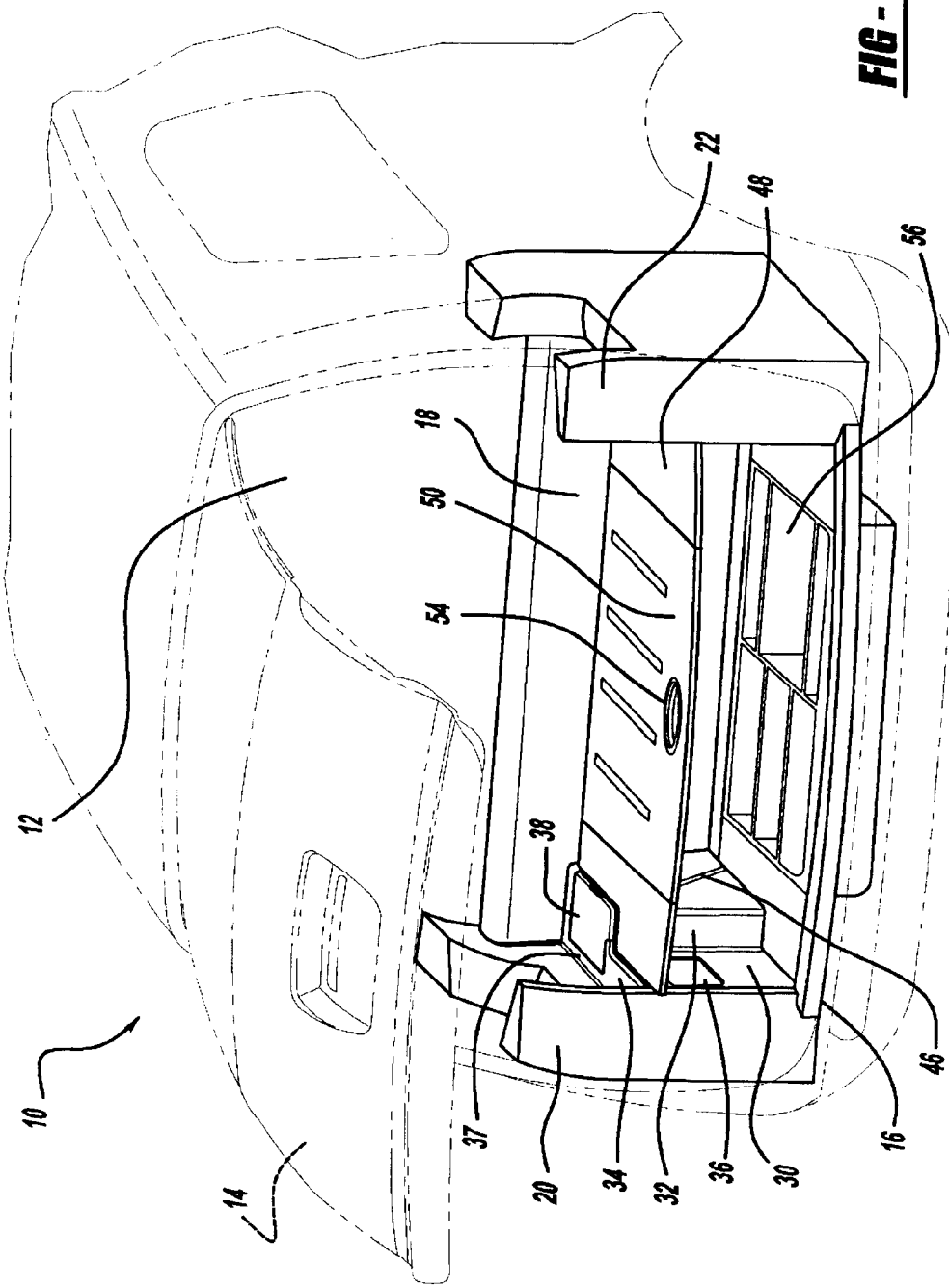

CARGO STORAGE DEVICE FOR A VEHICLE

BACKGROUND OF INVENTION

1. Field of the Invention

The present invention relates to storage devices, and more specifically, to a cargo storage device with a reconfigurable floor and an organizational bin for a sport utility type vehicle.

2. Background of the Invention

In many vehicles, and particularly sport utility type vehicles, cargo storage devices are lacking. The storage areas in these types of vehicles are usually defined by the floor, the back of the last row of seats, the side quarter panels, and the end gate of the vehicle. Because these types of vehicles do not have trunks or generally any other type of secured storage space, the operators needs are not accommodated in terms of security, versatility, and accessibility for stored items. For instance, items that stay in the vehicle such as jumper cables, tire jack, etc. get mixed in with other items like groceries, luggage, and valuables such as purses, laptops, etc. Because the storage space is generally open, there is no security for the valuables, accessibility to stored items is difficult as everything is mixed together, and as these items cannot be stacked upon each other, the storage space is not maximized.

In recent years, the demand for these types of vehicles has increased, attributable in part to their ability to carry more cargo than passenger cars. Efforts have thus been made to provide maximum passenger carrying capability while also being able to provide enhanced cargo carrying capability when desired by the vehicle operator. For example, flanges have been incorporated to support luggage, but this arrangement completely depends on the size of the luggage the operator wants to carry. Storage units have also been used, via use of shelf-like structures to partition the storage area. However, these units can be large and cumbersome, take up a significant amount of usable storage space available to the operator, and are in a number of movable parts such that they do not lend themselves well to being time-efficient or easy to use. Security is also an issue with stored items, as when a shelf-like structure is used to separate and keep stored items organized, the items are still visible from outside of the vehicle.

There continues to be a need to enhance the cargo carrying capabilities for these types of vehicles by increasing the functionability of the storage devices such that they are secure, accessible, versatile, and simple to use. As such, it would be beneficial to have a cargo storage device that incorporates a secured place to hold valuables, some sort of arrangement to divide storage space so items that are transported and items that remain in the vehicle can be separate, and versatility such that the device can be reconfigurable so as to always maximize available storage space as well as accommodate the operators needs and be easy for the operator to use.

It is therefore desired to have a cargo storage device with a reconfigurable floor to accommodate the users needs and maximize storage space and an organizational bin for secured storage of valuable items.

SUMMARY OF INVENTION

It is an object of the present invention to provide a cargo storage device for a vehicle that overcomes the disadvantages of the prior art.

Accordingly, the present invention advantageously provides a cargo storage device for a vehicle having a passenger space and an end gate including a back end situated adjacent a rearward-most seat, at least one pair of sidewalls extending from the back end and having a plurality of storage units therein, a floor situated between the sidewalls and reconfigurable between a lowered position and a raised position, a door situated in the floor and pivotally operable between a closed position and an opened position, an organizational bin situated beneath the floor and having a plurality of dividers therein, and wherein at least two opposing storage units have identical tracks thereon.

It is a feature of the present invention that the cargo storage device has a reconfigurable floor, such that it can be raised from its lowered position by being slid along tracks on both sides of the cargo storage device and repositioned to a raised position, while still providing access to the organizational bin when the reconfigurable floor is in either the lowered or raised position.

BRIEF DESCRIPTION OF DRAWINGS

These and other objects, features, and advantages of the present invention will become apparent from a reading of the following detailed description with reference to the accompanying drawings, in which:

FIG. 1A is a partial perspective detailed view of the track system of the cargo storage device according to the present invention;

FIG. 4 is a perspective view of a cargo storage device in a raised floor position according to the present invention.

DETAILED DESCRIPTION

Figure 1:
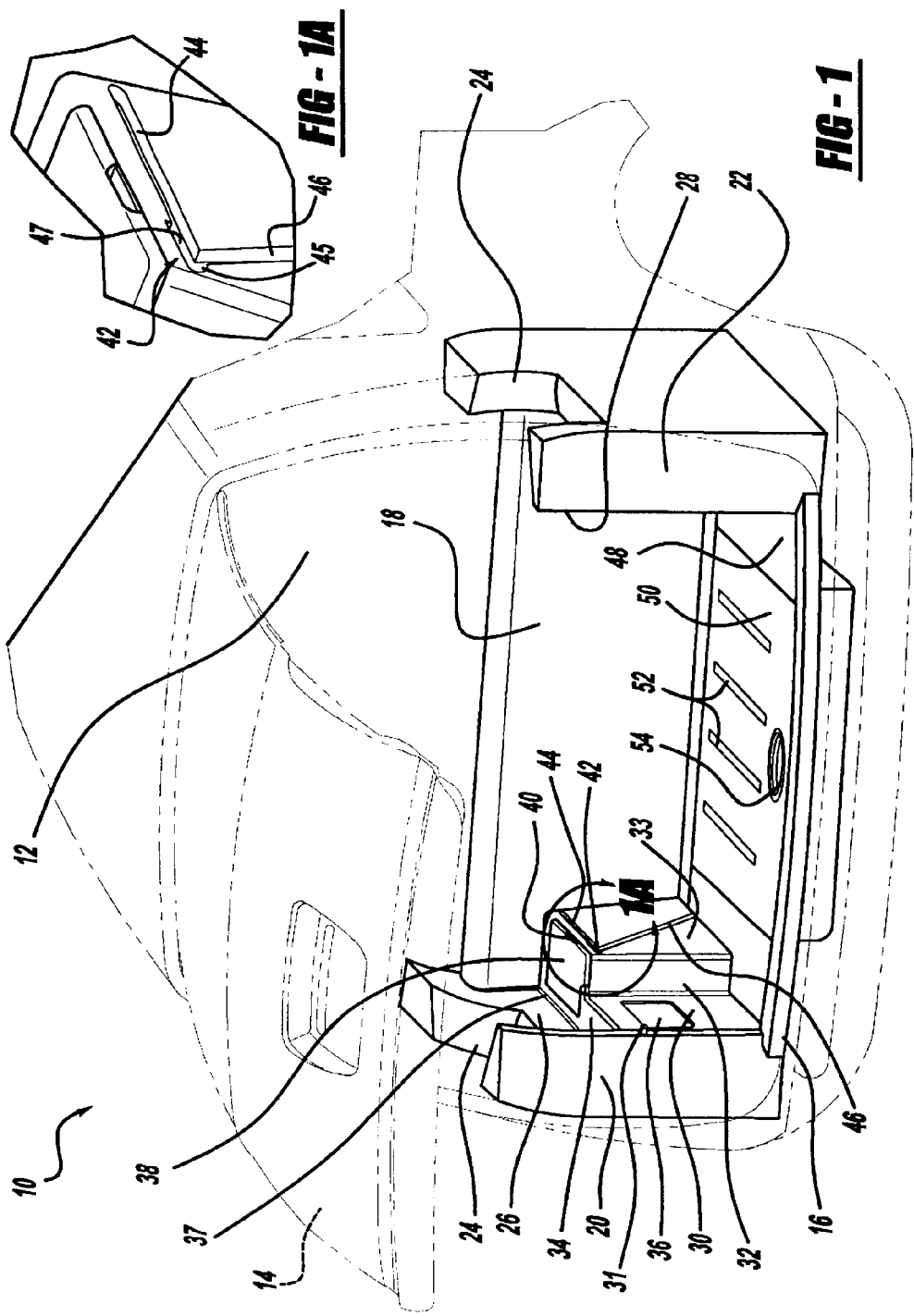
FIG. 1 is a perspective view of a cargo storage device in a lowered floor position according to the present invention.

Referring to FIG. 1, a vehicle 10 having a passenger space 12, an end gate 14, and a cargo storage device 16 is shown. The vehicle 10 is a sport utility type vehicle, and as such, the cargo storage device 16 is accessible via the passenger compartment 12 as well as the opened end gate 14 of the vehicle 10.

The cargo storage device 16 has a back end 18 which is substantially rectangular shaped that extends substantially the width of the vehicle 10. The back end 18 of the cargo storage device 16 rests just behind a rearward-most backseat (not shown) of the vehicle 10 and is substantially the same height such that the cargo storage device 16 is accessible from the rearward-most seat in the passenger space 12 of the vehicle 10.

The cargo storage device 16 has left and right sidewalls 20 and 22, respectively. The sidewalls 20 and 22 of the cargo storage device 16 are, in fact, incorporated to be the rear sidewalls of the vehicle 10. As such, the sidewalls 20 and 22 extend from the back end 18 of the cargo storage device 16 to the end of the vehicle 10. The sidewalls 20 and 22 of the cargo storage device 16 are a predetermined height greater than the height of the back end 18 of the cargo storage device 16. There are cut-out portions 24 in the sidewalls 20 and 22 such that the top of the sidewalls 20 and 22 are substantially unshaped.

The left and right sidewalls 20 and 22 of the cargo storage device 16 each have a left and right inner side 26 and 28, respectively. The inner sides 26 and 28 of the sidewalls 20 and 22 of the cargo storage device 16 each have a first storage unit 30, a second storage unit 32, and a pivot peg 31.

The first storage units 30 are substantially rectangular shaped and are a predetermined width of the sidewalls 20 and 22. The first storage units 30 are a predetermined height less than the height of the sidewalls 20 and 22 and are a predetermined length less than the length of the sidewalls 20 and 22. The first storage units 30 each have upper surfaces 34. The first storage units 30 each also have openings 36 therein for easy access to stored items in the units 30. The openings 36 are substantially rectangular shaped and extend a predetermined length of the units 30. The openings 36 are a predetermined height and are situated a predetermined height below the upper surfaces 34 of the units 30.

The second storage units 32 are also substantially rectangular shaped and are a predetermined length of the sidewalls 20 and 22. Each of the second storage units 32 extends a predetermined width beyond the width of the sidewalls 20 and 22. The second storage units 32 are a predetermined height less than the height of the sidewalls 20 and 22 and each have upper surfaces 37 such that the upper surfaces 37 of the second storage units 32 are flush with the upper surfaces 34 of the first storage units 30.

The upper surfaces 37 of the second storage units 32 each have opening lids 38 that are substantially rectangular shaped and extend substantially the length and width of the upper surfaces 37 of the units 32. The lids 38 each have notches 40 so the operator can open the lids 38 to access the storage space within the storage units 32. An extra feature of the first and second storage units 30 and 32 is the possibility of incorporating a 12-volt power supply outlet (not shown) for providing electricity to the back seat or the rear of the vehicle 10.

The second storage units 32 each have inner sides 33 with repositioning track systems 42 thereon. The track systems 42 are identical on each side of the cargo storage device 16. The track systems 42 each have horizontal tracks 44 and substantially diagonal tracks 46. The horizontal tracks 44 extend substantially the length of the inner sides 33 of the second units 32 and are a predetermined height below the upper surfaces 37 of the units 32.

The horizontal tracks 44 and the substantially diagonal tracks 46 are integrated, and as such, the substantially diagonal tracks 46 extend from the horizontal tracks 44 downward and forward, toward the back end 18 of the cargo storage device 16. A more detailed view of the track systems 42 can be seen in FIG. 1A. At the points of integration of the tracks 44 and 46, there are repositioning notches 45 that are a predetermined height above the horizontal tracks 44 and extend a predetermined length beyond the diagonal tracks 46. These notches 45 also extend a predetermined length forward over the horizontal tracks 44 such that the horizontal tracks 44 have a thicker transition area 47 near the integration points. The tracks 44 and 46, the repositioning notches 45, and the transition area 47 of the track systems 42 have a predetermined depth.

The pivot pegs 31 are at a predetermined height on the sidewalls 20 and 22. The pivot pegs 31 extend outward from the sidewalls 20 and 22 a predetermined distance. The pivot pegs 31 serve to guide the reconfigurable floor as described below.

The cargo storage device 16 has a reconfigurable floor 48. The reconfigurable floor 48 is substantially rectangular shaped and extends from the storage units 30 and 32 of the left sidewall 20 to the storage units 30 and 32 of the right sidewall 22. The reconfigurable floor 48 extends substantially the length of the cargo storage device 16 and is a predetermined thickness. The reconfigurable floor 48 has a security key lock (not shown) to engage when the floor 48 is in the lowered position. There are also tie-down hooks (not shown) to allow for the security of stored items.

The floor 48 has a pivotable door 50 therein. The door 50 is substantially rectangular shaped and extends substantially the length and width of the reconfigurable floor 48. The door 50 is a predetermined thickness. The door 50 is pivotable via hinges, as known in the art, and is supported by small lips that form supportive ledges along the sides of the reconfigurable floor 48. There is a sliding latch (not shown) that may be slid to lock the door 50 in place in the reconfigurable floor 48. This may be accomplished by using a wedge that slides down, pushing two rods apart which act as the pins at their ends. Another option is to have the latch slide a pin on a wheel that, when rotated, slides the two rods inward or outward, or any other commonly used latching method as known in the art. The door 50 also has rubber strips 52, or the like, on its surface to reduce the sliding and rattling of items placed upon it. The door 50 has a handle 54 therein in order to move it in various positions.

Figure 2:
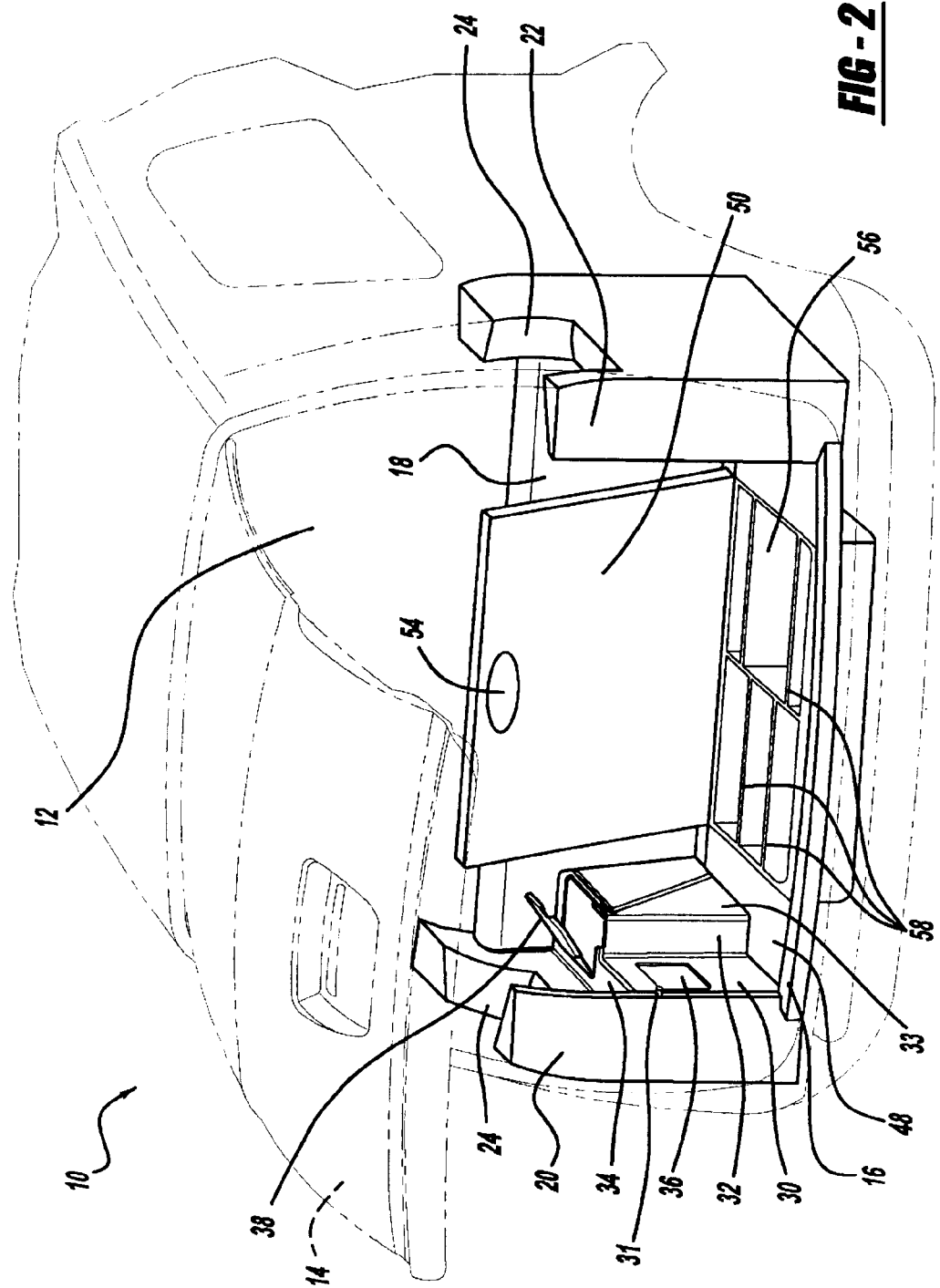
FIG. 2 is a perspective view of a cargo storage device in a lowered floor position with an opened door providing access to an organizational bin according to the present invention.

As such, in FIG. 2 the door 50 is in an opened position. The door 50 is maintainable in the opened vertical position, if desired, to help haul and store items. As seen here, when the door 50 is opened, there is access to an organizational bin 56. The organizational bin 56 is substantially rectangular shaped and extends substantially the length and width of the door 50. The organizational bin 56 is a predetermined depth, and is located such that it is entirely beneath the floor 48.

The bin 56 has a plurality of dividers 58 that slide into side slots (not shown), as known in the art. The dividers 58 are removable and reconfigurable to fit the operators needs. Also, the bin 56 has storage slots (not shown) nearest to the end gate 14 in which the dividers 58 can be stacked and stored, if desired, so that they are out of the way. The organizational bin 56 has a thin rubber mat (not shown) on the bottom to prevent sliding, scratching, or rattling of stored items. The bin 56 also has a drain and plug (not shown) for easy cleaning. Another feature the bin 56 has are holes (not shown) that could be used for installing a CD changer, or the like.

As mentioned, the floor 48 of the cargo storage device 16 is reconfigurable to fit the operators storage needs. In FIG. 1, the floor 48 is in a lowered position and the door 50 is closed. In such a position, valuables could be stored in the bin 56 and the door 50 can be locked for security. More items could then be stored on the floor 48 such that they are accessible via the passenger space 12 or by the opening of the end gate 14. Items can also be stored in any or all of the side storage units 30 and 32 in this position.

Referring to FIG. 2, the floor 48 is in a lowered position and the door 50 is opened providing access to the organizational bin 56. In this position, the door 50 can remain in a vertical position for storing larger items in the bin 56. Access to any or all of the side storage units 30 and 32 is available for other stored items in this position. Access to the stored items is available via the passenger space 12 or by the opening of the end gate 14.

Figure 3:
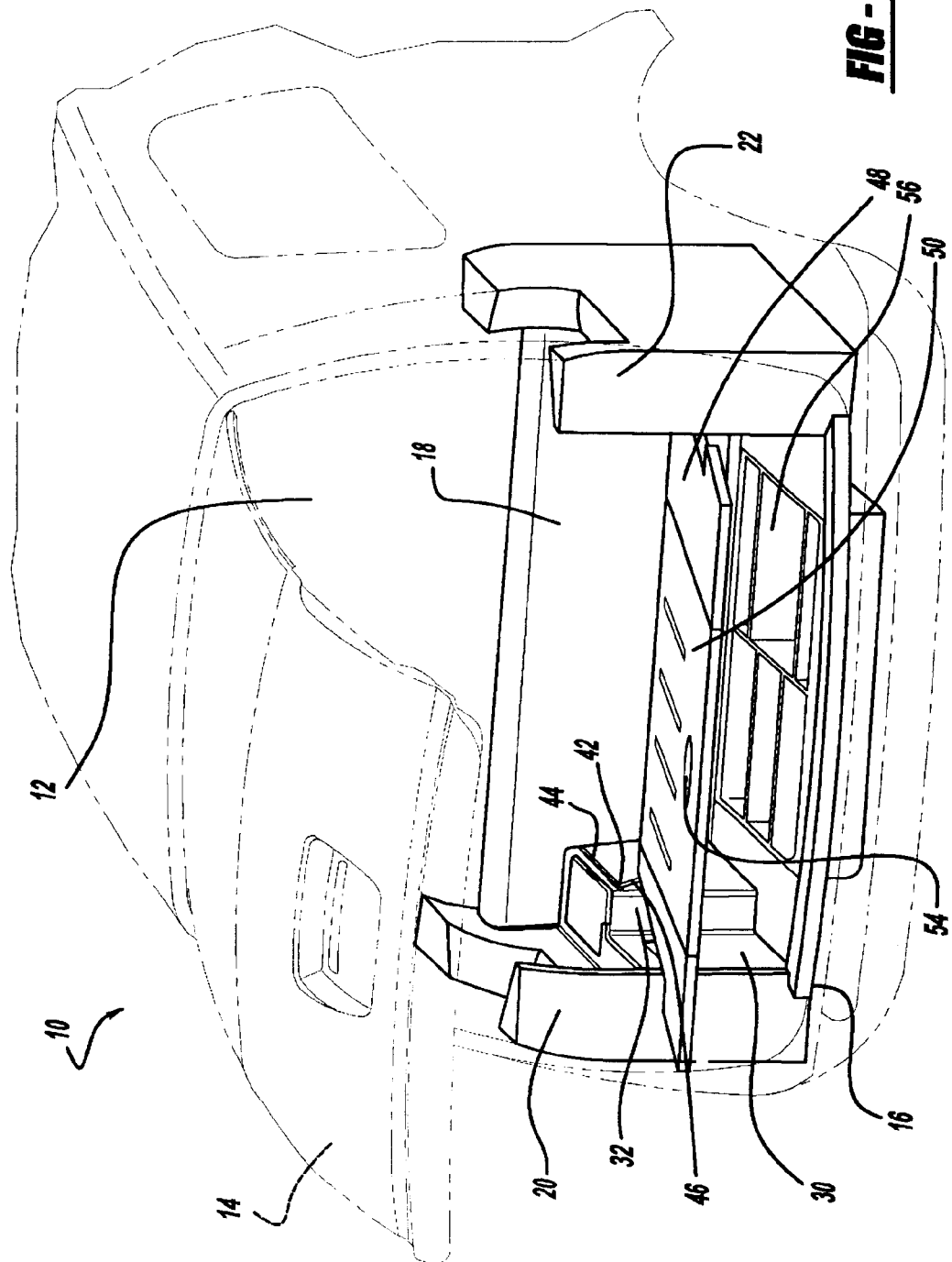
FIG. 3 is a perspective view of a cargo storage device in a transitional floor position according to the present invention.

The reconfiguration of the floor 48 is shown in FIGS. 3 and 4. In FIG. 3, the door 50 is closed and in a locked position within the floor 48. As such, when the handle 54 is pulled upward, the floor 48 raises as does the door 50. Upon this action, the floor 48 clears the pivot pegs 31 on the sidewalls 20 and 22.

The mechanics behind the raising floor 48 are standard sliding pegs on the floor 48 that slide along the repositioning track systems 42. The sliding pegs may have caps on their ends to prevent them from coming out of the tracks 44 and 46, the repositioning notches 45, and the transition area 47 of the track systems 42. Moreover, the geometry of the sidewalls 20 and 22 of the cargo storage device 16 will reduce side-to-side movement.

After the floor 48 is lifted, it is slid, via the sliding pegs, along the substantially diagonal tracks 46. Once this motion begins, the pivot pegs 31 on the sidewalls 20 and 22 are engaged by the floor 48 and serve as guides for the floor 48 the entire way up the diagonal tracks 46. At the end of the diagonal tracks 46, the sliding pegs of the floor 48 are brought into the repositioning notches 45 of the track systems 42. Here, the pivot pegs 31 act as pivot points as the floor 48 is brought to a horizontal position. Upon this action, the sliding pegs of the floor 48 fall into the transition area 47 of the horizontal tracks 44.

The floor 48 is then slid along the horizontal tracks 44 until it reaches the end of the tracks 44 near the back end 18 in which it will preferably fall into a locked position against the back end 18 of the cargo storage device 16. This locking could be accomplished through locking notches (not shown) in the bottom of the floor 48 that mate with the pivot points of the tracks 44 and 46 when the floor 48 is fully slid horizontally against the back end 18 of the cargo storage device 16. The raised floor 48 can go back to its lowered position in the same manner, but in reverse order.

Here in FIG. 4, in the raised floor 48 position, larger items can be stored in the organizational bin 56. In this position, the larger items in the bin 56 are covered by the floor 48 so that they remain secure. The raised floor 48 is positioned such that it is flush with both the upper surfaces 34 of the first storage units 30 as well as the upper surfaces 37 of the second storage units 32. As such, items can be stored on the floor 48 and be level so as to not tip over or fall. Also because of the flushness, access to the second units 32 via the lids 38 is still available, as is the openings 36 of the first units 30 to store more items. Here, items can be reached via opening the end gate 14, or items on the floor 48 can be accessed via the passenger space 12 of the vehicle 10.

Most all parts of the cargo storage device 16 are made of plastics, through injection molding. An alternative for the reconfigurable floor 48 and its door 50, without departing from the scope of the present invention, could be structural foam, as this material is also strong, durable, and lightweight.

While only one embodiment of the cargo storage device of the present invention has been described, others may be possible without departing from the scope of the following claims.

What is claimed is:

1. A cargo storage device for a vehicle having a passenger space and an end gate comprising:
    a back end situated adjacent a rearward-most seat;
    at least one pair of sidewalls extending from the back end and having a plurality of storage units therein;
    a floor situated between the sidewalls and reconfigurable between a lowered position and a raised position;
    a door situated in the floor and pivotally operable between a closed position and an opened position;
    an organizational bin situated beneath the floor and having a plurality of dividers therein; and
    wherein at least two opposing storage units have identical repositioning tracks thereon.

2. The cargo storage device as defined in claim 1, wherein the sidewalls have coplanar upper surfaces.

3. The cargo storage device as defined in claim 2, wherein the floor is substantially flush with the sidewall coplanar upper surfaces when in the raised position.

4. The cargo storage device as defined in claim 1, wherein the repositioning tracks have a first portion that extends upwardly and rearwardly from the back end.

5. The cargo storage device as defined in claim 4, wherein the repositioning tracks further have a second portion that extends rearwardly and horizontally from the back end.

6. The cargo storage device as defined in claim 5, wherein the first and second track portions intersect in a transition area.

7. The cargo storage device as defined in claim 1, wherein the plurality of dividers are removable and reconfigurable.

8. A cargo storage device for a vehicle having a passenger space and an end gate comprising:
    a back end situated adjacent a rearward-most seat;
    at least one pair of sidewalls extending from the back end and having a plurality of storage units therein with coplanar upper surfaces, where at least two opposing storage units have identical opposing tracks thereon;
    a floor situated between the sidewalls and slidingly received by the opposing tracks, reconfigurable between a lowered position and a raised position thereby;
    a door situated in the floor pivotally operable between a closed horizontal position and an opened substantially vertical position;
    an organizational bin situated beneath the floor and having a plurality of dividers therein; and
    wherein when the floor is in a raised position, the floor and coplanar upper surfaces of the storage units are substantially flush.

9. The cargo storage device as defined in claim 8, wherein the opposing tracks have a first portion that extends upwardly and rearwardly from the back end.

10. The cargo storage device as defined in claim 9, wherein the opposing tracks further have a second portion that extends rearwardly and horizontally from the back end.

11. The cargo storage device as defined in claim 10, wherein the first and second track portions intersect in a transition area.

12. The cargo storage device as defined in claim 8, further including at least one pivot peg extending from a sidewall and slidingly engaging the floor when being repositioned.

13. The cargo storage device as defined in claim 12, wherein the pivot peg is adapted to aid the transition of the floor from the opposing track first portion to the second portion.

14. The cargo storage device as defined in claim 8, wherein the plurality of dividers are removable and reconfigurable.

15. A cargo storage device for a vehicle having a passenger space and an end gate comprising:
    a back end situated adjacent a rearward-most seat;
    at least one pair of sidewalls extending from the back end and having a plurality of storage units therein;
    a pair of repositioning tracks on opposing storage units wherein each track has a diagonal portion and a horizontal portion;
    a floor situated between the sidewalls and slidingly received by the opposing tracks, reconfigurable between a lowered position and a raised position thereby;
    a door having a handle therein situated in the floor pivotally operable between a closed horizontal position and an opened substantially vertical position;

an organizational bin situated beneath the floor having a plurality of dividers therein; and wherein when reconfiguring the floor from a lowered position to a raised position, the floor is lifted from the lowered position via the handle, slid along the opposing diagonal track portions, transitioned, and slid along the opposing horizontal track portions until the floor substantially reaches the back end, where the floor is then in a raised position.

16. The cargo storage device as defined in claim 15, wherein the sidewalls have coplanar upper surfaces.

17. The cargo storage device as defined in claim 16, wherein the floor is substantially flush with the sidewall coplanar upper surfaces when in the raised position.

18. The cargo storage device as defined in claim 15, wherein the repositioning track diagonal portions extend upwardly and rearwardly from the back end.

19. The cargo storage device as defined in claim 18, wherein the repositioning track horizontal portions extend rearwardly and horizontally from the back end.

20. The cargo storage device as defined in claim 19, wherein the diagonal portions have a rearward most point and the horizontal portions have a rearward most point where the diagonal and horizontal portions intersect and transition.

* * * * *